United States Patent [19]

Ozawa

[11] 4,224,274

[45] Sep. 23, 1980

[54] METHOD FOR MANUFACTURE OF CONCRETE PRODUCTS

[75] Inventor: Seiichi Ozawa, Tokyo, Japan

[73] Assignee: Ozawa Concrete Industry Co., Ltd., Tokyo, Japan

[21] Appl. No.: 951,054

[22] Filed: Oct. 12, 1978

[30] Foreign Application Priority Data

Jun. 19, 1978 [JP] Japan .................................. 53-73157

[51] Int. Cl.² .............................................. C04B 13/02
[52] U.S. Cl. ...................................................... 264/333
[58] Field of Search .................................. 264/333, 82

[56] References Cited

U.S. PATENT DOCUMENTS 4,067,939 1/1978 Lowe .................................... 264/333

FOREIGN PATENT DOCUMENTS 2043081 4/1971 Fed. Rep. of Germany ........... 264/333
41-19192 7/1966 Japan ........................................ 264/333
220800 2/1968 U.S.S.R. .................................. 264/333
341780 9/1970 U.S.S.R. .................................. 264/333

*Primary Examiner*—John A. Parrish
*Attorney, Agent, or Firm*—Kurt Kelman

[57] ABSTRACT

Concrete products possessing properties far excelling those of conventional autoclaved concrete products are obtained by placing fresh concrete mix in molding frames adapted to withstand elevated temperatures and increased pressure, closing the filled molding frames airtightly, and heating the molding frames and the concrete mix held therein while inhibiting completely the leakage of water from within the molding frames and thereby allowing the concrete mix inside the molding frames to be cured while in a state of being maintained at elevated temperatures under increased pressure.

5 Claims, 16 Drawing Figures

METHOD FOR MANUFACTURE OF CONCRETE PRODUCTS

BACKGROUND OF THE INVENTION

This invention relates to a method for the manufacture of concrete products by the thermal curing of concrete mix confined within airtightly closed molding frames.

It is widely known that for the thermal curing of concrete mix, there is generally adopted a method which comprises treating the concrete mix with steam under atmospheric pressure. According to this conventional method, since the concrete mix is heated with steam under atmospheric pressure, the highest temperature to which the concrete mix can be heated is 100° C.

By this method, the cement in the concrete mix reacts with water to produce a low-crystallinity tobermorite of the structural formula $3CaO.2SiO_2.3H_2O$ as shown by the following reaction formula:

$$\begin{matrix} 3CaO\,.\,SiO_2 \\ 2CaO\,.\,SiO_2 \end{matrix} + 5H_2O \longrightarrow 3CaO\,.\,2SiO_2\,.\,3H_2O + 2Ca(OH)_2$$

As is clear from this reaction formula, in concrete products cured at temperatures not exceeding 100° C., free calcium hydroxide is present besides the aforementioned low-crystallinity tobermorite.

For the purpose of improving the quality of concrete products, an autoclave method is available which cures the concrete mix at elevated temperatures under increased pressure.

This autoclave method comprises causing pre-cured concrete products released from molds to be cured at elevated temperatures in the range of from 150° to 200° C. under increased pressure in the range of from 5 to 16 kg/cm$^2$. Consequently, the part of the silica which has escaped reaction during the pre-curing performed at temperatures not exceeding 100° C. is allowed to react with the aforementioned free calcium hydroxide to produce a large amount of a stable, crystalline hydride ($5CaO.6SiO_2.5H_2$). Owing to this curing reaction, the concrete products cured by the autoclave method acquire sufficient strength in a shorter time than the concrete products cured at temperatures not exceeding 100° C. Thus, the autoclave method is notably effective in improving the quality of concrete products. The autoclave method nevertheless has the following drawbacks:

(1) Since the curing of concrete products takes place under harsh temperature and pressure conditions of 200° C. and 16 kg/cm$^2$, there must be installed an autoclave capable of withstanding these conditions. Thus, the autoclave method entails a remarkably high equipment cost.

(2) Since the autoclave interior is exposed to elevated temperatures and increased pressure, its inner volume is limited by reason of operational safety. Thus, the autoclave method fails to provide the desired curing for concrete products of large dimensions.

(3) Since fresh concrete mix is pre-cured (generally by means of steam) until it acquires strength enough to withstand possible impacts exerted thereon during the work of mold release and, after this strength is acquired, the pre-cured concrete products are released from their molds and then are subjected to the final curing in the autoclave, the total time required for curing is too long for the curing of concrete products to be efficient. Besides, the operational efficiency is inferior because the operation inevitably involves an extra task of the transfer of pre-cured concrete products released from the molds into the autoclave. Moreover, the concrete products suffer from inferior dimensional accuracy because of the phenomenon of thermal expansion.

An object of the present invention is to provide a method which permits the easy manufacture of concrete products possessing properties far excelling those of concrete products manufactured by the autoclave method.

Another object of this invention is to provide a method which permits the easy manufacture of concrete products of high dimensional accuracy and good quality with a notably shorter curing time.

SUMMARY OF THE INVENTION

To accomplish the objects described above according to the present invention, there is provided a method for the manufacture of concrete products which comprises placing fresh concrete mix in molding frames adapted to withstand elevated temperatures and increased pressure, closing the filled molding frames airtightly, and heating the molding frames and the concrete mix held therein while inhibiting completely the leakage of water from within the molding frames and thereby allowing the concrete mix inside the molding frames to be cured while in a state of being maintained at elevated temperatures under increased pressure.

By the method of this invention for the manufacture of concrete products, since the molding frame filled with fresh concrete mix is heated while being retained in its airtightly closed state, the concrete mix inside the molding frame will in effect be cured under the conditions of elevated temperatures and increased pressure without the involvement of any pre-curing treatment. With simple equipment, therefore, this method permits the manufacture of concrete products possessing mechanical strength far excelling that of concrete products manufactured by the conventional autoclaving method.

Generally after concrete is cured at elevated temperatures under increased pressure, it requires to be cooled to the ambient temperature. If such cured concrete products are cooled suddenly, they may possibly sustain cracks. According to the method of this invention, even such cured concrete products are enclosed within the molding frames made of a material such as steel and, therefore, are cooled while being held constantly in a compressed state and allowed to exchange heat with the molding frames. Thus, the time required for the cooling of cured concrete products is short compared with the conventional method. Thus, concrete products having high dimensional accuracy can be obtained readily.

The term "concrete products" as used in the present specification embraces those formed by mixing varying kinds of cements with water and having fine aggregates and coarse aggregates incorporated, or not incorporated, therein as occasion demands and also embraces those which have the aforementioned mixes further mixed with other additive materials such as silica powder, water reducing agent and coloring agent. The term further embraces concrete products of many other forms including nonreinforced concrete products using no reinforcement, reinforced concrete products having buried therein such reinforcement as steel bars, steel frames, glass fibers and steel fibers and prestressed concrete products prestressed by the incorporation of proper tensile materials.

The term "molding frames" as used in the specification embraces not only those which are assembled prior to use in the manufacture of concrete products and disassembled to permit the release of cured concrete products but also those which form part of the concrete products after the concrete products have been molded (such as, for example, composite piles having concrete cylinders coated with steel pipes).

The other objects and characteristic features of the present invention will become apparent from a description to be given in detail herein below with reference to the accompanying drawings.

DESCRIPTION OF THE PREFERRED EMBODIMENTS

Figure 1:
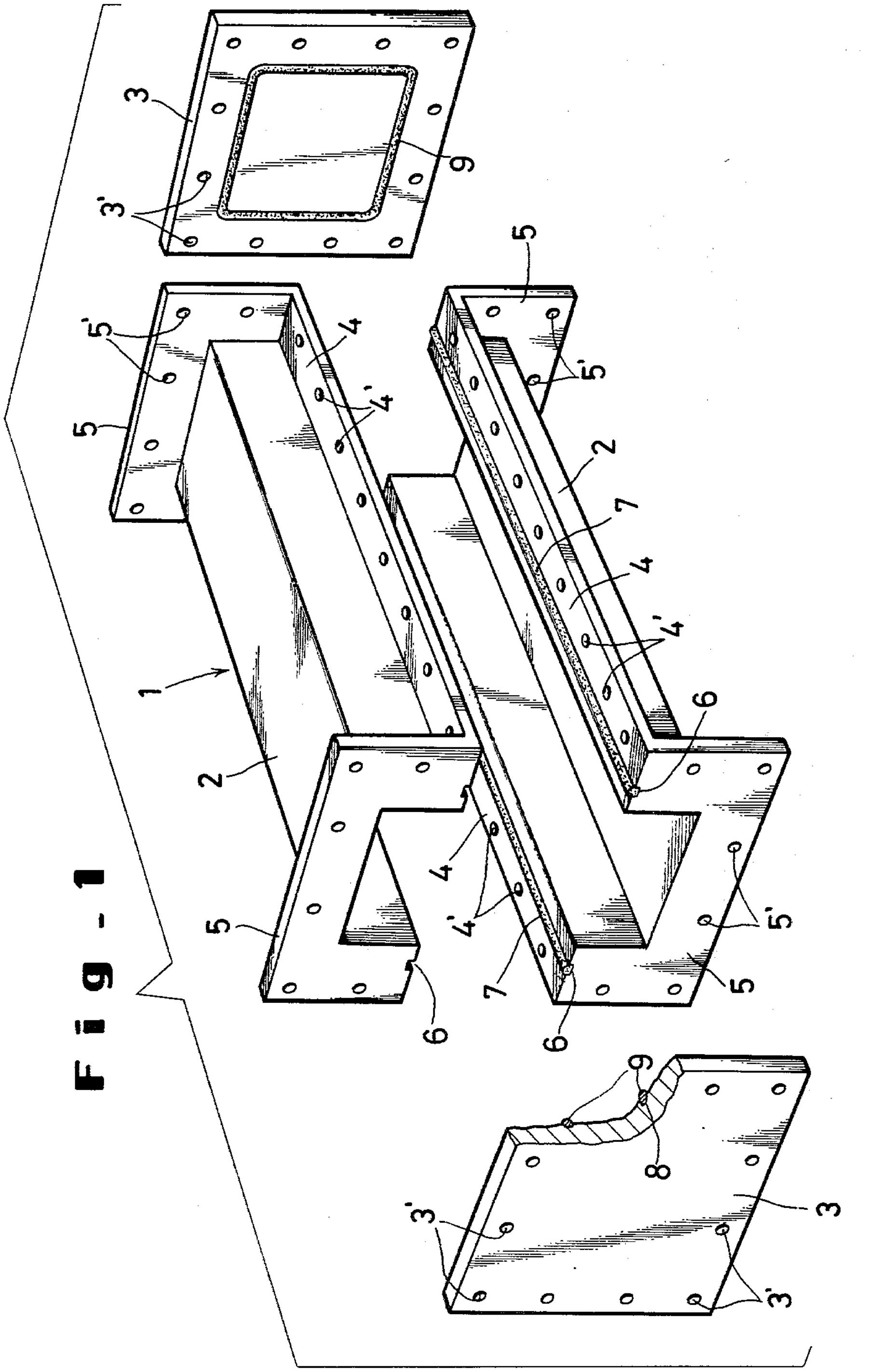
FIG. 1 is an exploded perspective view of one preferred embodiment of the molding frame to be used for working the present invention.
Figure 2:
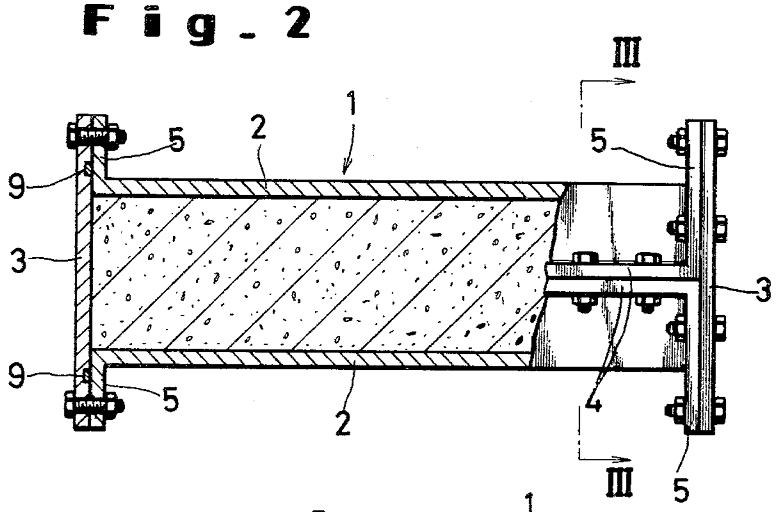
FIG. 2 is a partially cutaway side elevation illustrating the molding frame of FIG. 1 in a state filled with fresh concrete mix.
Figure 3:
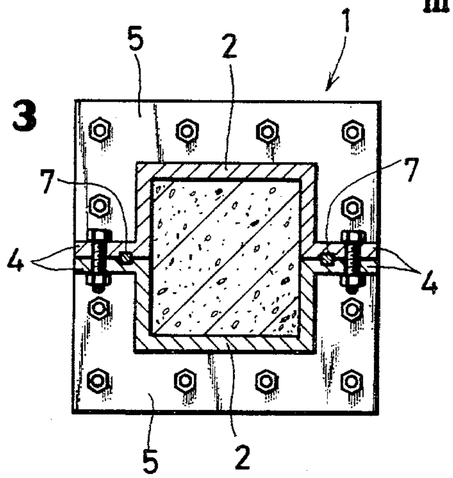
FIG. 3 is a sectioned view taken along the line III—III of FIG. 2.

FIGS. 1–3 represent a basic preferred embodiment of the method of this invention for the manufacture of concrete products. With reference to the drawing, a molding frame 1 comprises a plurality of separable frame segments 2 and two cover pieces 3 adapted to close the terminal openings to be formed when the frame segments 2 are assembled. The frame segments 2 and the cover pieces 3 are formed of metal plate capable of withstanding elevated temperatures and increased pressure and are shaped so as to enclose a cavity conforming to the outer shape of a concrete product desired to be manufactured. The illustrated preferred embodiment represents a molding frame to be used for the manufacture of a concrete product in the shape of a square pillar. This molding frame uses two frame segments 2 of which the cross section taken in a direction perpendicular to the direction of length has the shape of an angular "U". Each of the frame segments 2 has outwardly extending flanges 4 formed one each on the edges of the opposite lateral sides thereof relative to the longitudinal direction and also has flanges 5 formed one each on the edges of the longitudinal ends thereof. These flanges 4, 5 have through holes 4', 5' perforated therein. On the inner surfaces of the flanges 4, grooves are formed one each in the longitudinal direction and packings 7 are planted one each in these grooves. These packings 7 are desirably made of a silicone rubber-based or asbestos-based material capable of withstanding elevated temperatures and increased pressure of the order used in the manufacture of concrete products.

Perforations 3' are formed at positions spaced along the edges of each of the two cover pieces 3. On the inner surface of each cover piece 3, an endless groove 8 is formed in the shape of the four sides of a substantial square and a packing 9 of the aforementioned packing material is planted in the endless groove 8.

Manufacture of a concrete product by use of the molding frame 1 which is constructed as described above involves an initial procedure comprising the steps of opposing the two frame segments 2 to each other and bringing the corresponding flanges 4 into intimate contact and joining the flanges tightly by passing bolts through the registered perforations 4' in the flanges and fastening the bolts with nuts to give rise to a partially complete molding frame having a square cross section. One of the cover pieces 3 is applied to one of the square flanges formed at the longitudinal ends of the molding frame and tightly joined thereto by having bolts passed through registered perforations 3' and 5' and fastened with nuts. The attached cover piece 3 forms a bottom of the molding frame. Then, concrete mix is poured into the interior of the bottomed molding frame through the remaining open end while vibrations or some other shocks are continually exerted such as on frame segments to preclude the otherwise possible entrapment of voids. After the molding frame is consequently filled to capacity with the concrete mix, the remaining cover piece 3 is applied to the square frame 5 at the open end and joined tightly thereto by having bolts passed through the registered perforations 3' and 5' and tightened with nuts. Since in the resultant state of the molding frame, packings 7, 9 are interposed between the tightly joined faces of the flanges 4 and between those of the flanges 5 and the cover pieces 3 respectively, the airtightness of the interior of the molding frame now filled with the concrete mix is greatly heightened.

When the molding frame in this state is heated directly or indirectly, therefore, the water contained in the concrete mix is vaporized to bring forth the conditions of elevated temperature and increased pressure within the molding frame, so that the concrete mix will be cured under the same conditions as those involved in the conventional autoclaving method. The tight jointer of the flanges 4 themselves and that of the flanges 5 with the cover pieces 3 need not solely rely on bolts but may be obtained by use of bands or some other suitable fastening means.

The method by which the molding frame filled with the concrete mix is heated will be described afterward.

Figure 5:
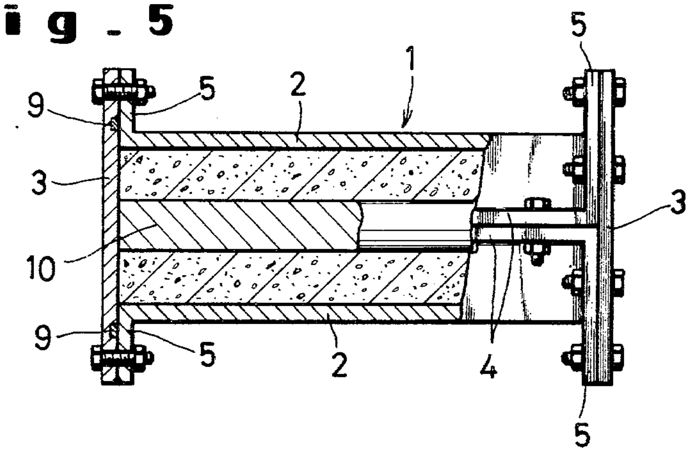
FIG. 5 is a partially cutaway side elevation of the molding frame of FIG. 4 in a state filled with fresh concrete mix.
Figure 4:
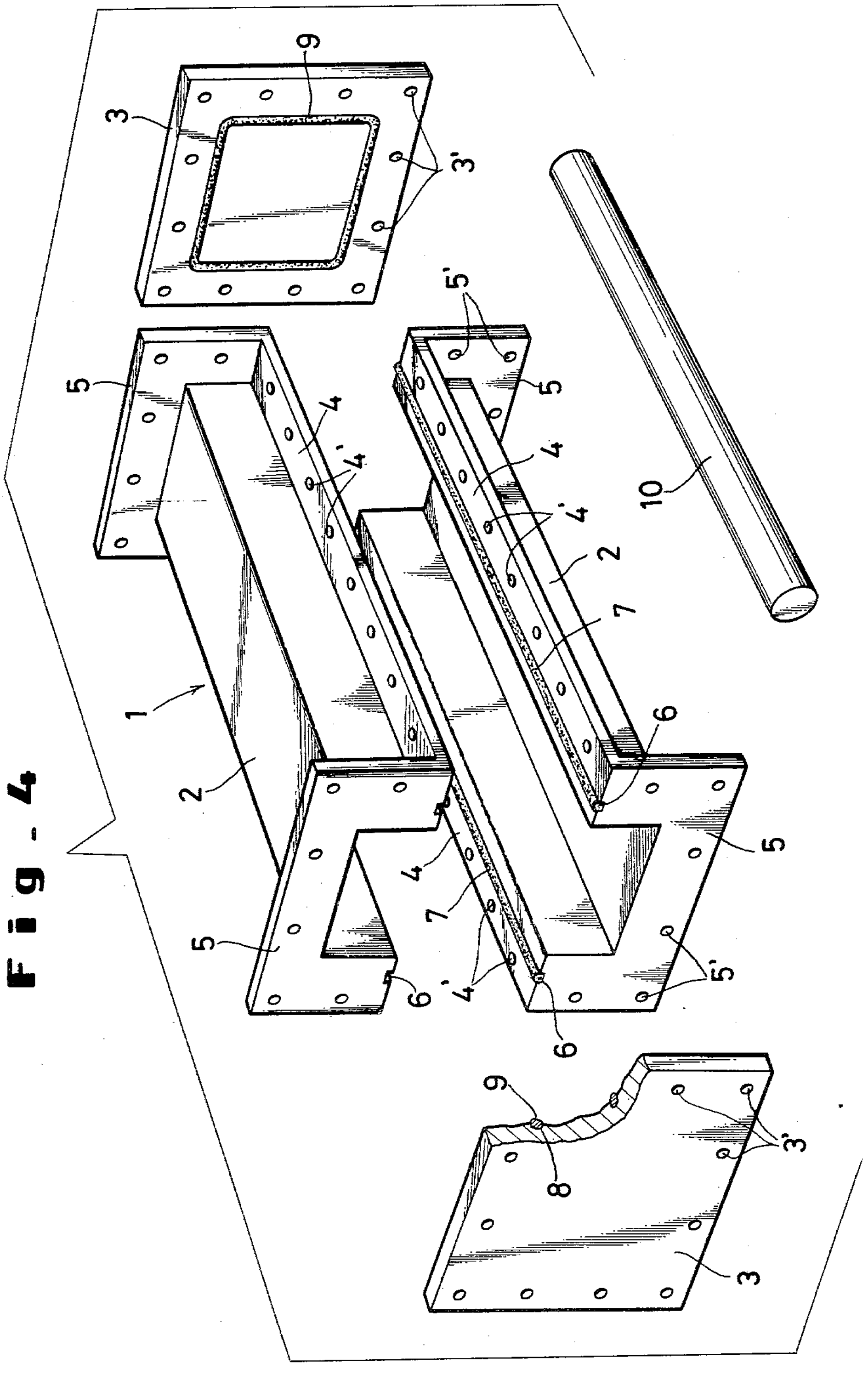
FIG. 4 is an exploded perspective view of another preferred embodiment of the molding frame to be used for working the present invention.

FIG. 4 and FIG. 5 represent a preferred embodiment in which an additive part is simultaneously buried in the concrete mix in the manufacture of a concrete product. In this case there is involved a procedure which comprises the steps of opposing the frame segments 2 to each other, uniting their respective flanges 4, airtightly sealing one of the opposite end openings with one of the cover pieces 3, inserting a part 10 in the interior of the molding frame 1, filling the interior of the molding frame with concrete mix and, with the part 10 left as it is or removed out of the interior of the molding frame, airtightly sealing the remaining end opening of the molding frame 1 with the remaining cover piece 3 and subjecting the filled molding frame to heating. In the present preferred embodiment, the part 10 is illustrated in the shape of a cylinder to be inserted longitudinally in the interior of the molding frame 1. If this part 10 is removed from the molding house after the filling of concrete mix and the molding frame is then sealed airtightly, the concrete product which is obtained after thermally curing the concrete mix has the shape of a square pillar containing a circular bore in the longitudinal direction at the center thereof. If the part 10 is left buried in the concrete mix and the molding frame 1 is then sealed airtightly, then the concrete product which is obtained after thermally curing the concrete mix contains this part 10 at the center.

The part 10 used may be any of various shapes to suit the purpose for which the concrete product manufactured by use of this part is intended. As to the position at which the part 10 is inserted in the concrete product, the center of the interior is not the only allowable position. The part may be inserted along one inner lateral face or at one end directly adjoining the inner surface of the cover piece.

In the present preferred embodiment, the component parts whose numeral symbols have not been mentioned are similar to those of the preceding preferred embodiment denoted by the same numeral symbols.

Figure 6:
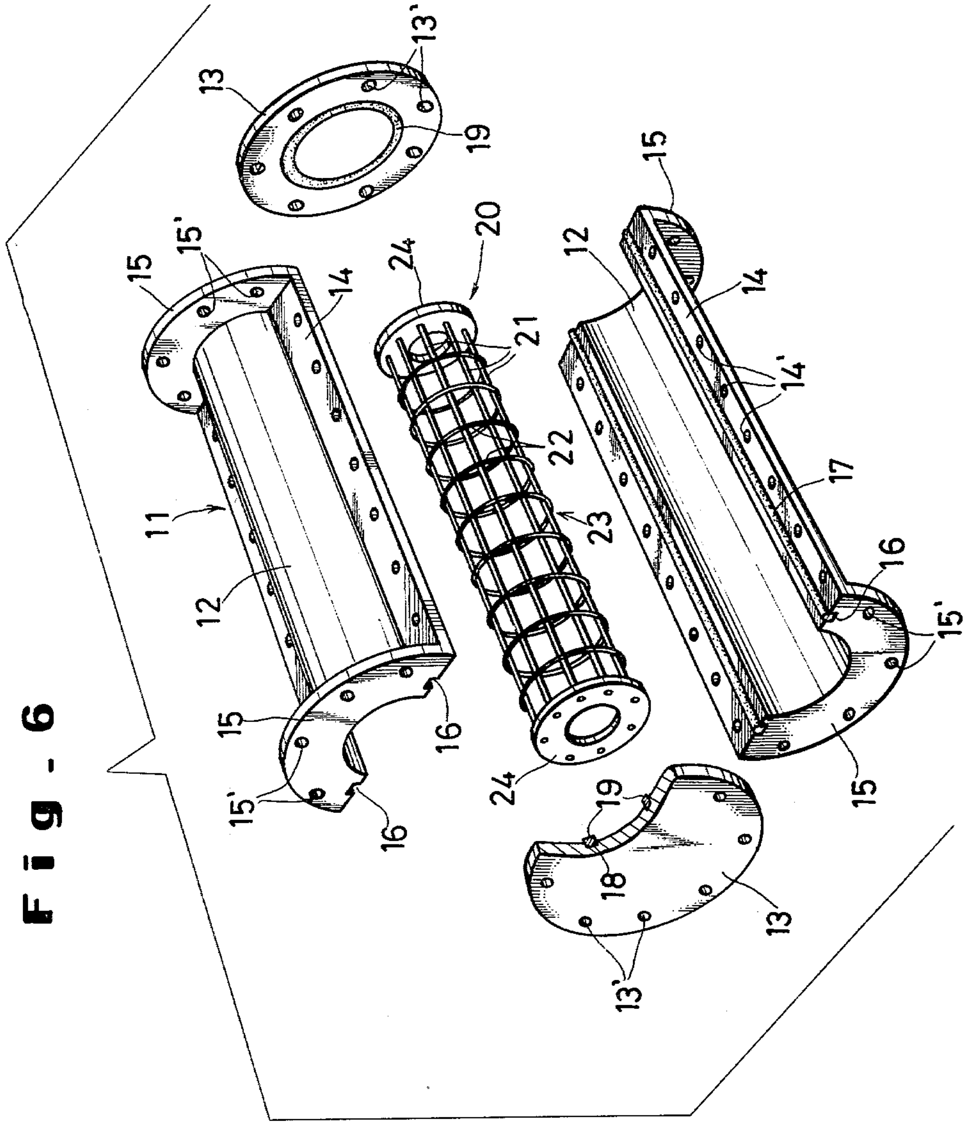
FIG. 6 is an exploded perspective view of still another preferred embodiment of the molding frame to be used for working the present invention.
Figure 7:
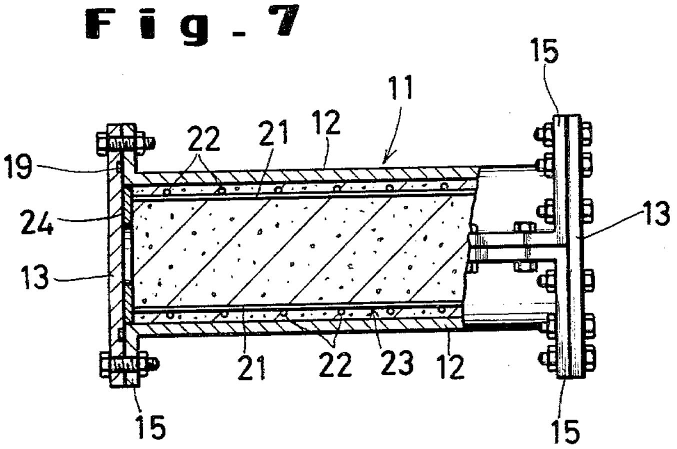
FIG. 7 is a partially cutaway side elevation of the molding frame of FIG. 6 in a state filled with fresh concrete mix.

FIG. 6 and FIG. 7 represent still another preferred embodiment of this invention wherein prestressed concrete products are obtained by the method of this invention. A molding frame 11 is formed of a plurality of separable frame segments 12 and a plurality of cover pieces 13 serving to close end openings which are formed when the frame segments 12 are assembled. The cross section of each frame segment 12 taken along a line perpendicular to the longitudinal direction is semicircular. Flanges 14 are formed one each along the lateral edges of this semicircular frame segment that run longitudinally. Semiannular flanges 15 are formed one each along the longitudinally opposite ends of the frame segment. In these flanges 14, 15, perforations 14', 15' are respectively formed. On the inner surfaces of the flanges 14, grooves 16 are formed one each in the longitudinal direction and packings 17 are planted one each in these grooves 16. On the inner surface of each cover piece 13 which has perforations 13' formed at positions circularly spaced along the peripheral edge thereof, an endless groove 18 is formed in the shape of a circle and a packing 19 is planted in this endless groove 18 similarly to the preceding preferred embodiment.

Particularly the present preferred embodiment concerns a method for manufacturing prestressed concrete products and, therefore, uses as a part 20 a steel reinforcement basket 23 which is made by winding a coiled steel reinforcement 22 spirally around a set of circularly spaced PC steel bars 21 and fastening them together by the joint-welding technique. Circular end plates 24 are attached one each to the opposite ends of the steel reinforcement basket 23.

Manufacture of a prestressed concrete product by use of the molding frame 11 and the steel reinforcement basket 23 involves an initial procedures which comprises the steps of setting the steel reinforcement basket 23 in position in one of the frame segments 12, filling the frame segment with concrete mix, covering the steel reinforcement basket with the remaining frame segment 12 and firmly joining the flanges 14 of the frame segments by use of bolts or bands to seal the flanges airtightly. Then, the opposite end plates 24 are drawn outwardly to impart tension to the PC steel rods 21 and the cover pieces 13 are applied to the flanges 15 and fastened tightly to seal the interior of the molding frame airtightly. Thereafter, the molding frame 11 is spun around its axis or vibrated to ensure ample compaction of the concrete mix held therein. Finally, the molding frame 11 is heated directly or indirectly at elevated temperatures.

Comparison of the method of manufacture described above with the conventional autoclaving method reveals the following differences in terms of the process of manufacture.

By the autoclaving method, the curing with steam must be continued until it imparts to the concrete mix the strength required for safe release of the product from the molding frame and to enable the concrete to be prestressed as designed. The method of this invention described above does not require any curing with steam but effects the curing simply by causing the airtightly sealed molding frame to be heated as it is. Generally, the steam curing treatment necessitates about 10 hours' time, starting with the precuring phase and ending with the cooling phase. Compared with this time requirement, the time required by the method of the present invention is notably short. Between the two methods under consideration, there is an outstanding difference in the compressive strength of concrete exhibited at the time the concrete product is released from the molding frame and subjected to a prestressing treatment. For example, while the concrete produced solely by the steam curing in accordance with the autoclaving method has a strength of about 300 $kg/cm^2$, the product by the method of this invention described above has a strength of 1000 $kg/cm^2$, a value more than three times that of the autoclaved product. This means that this invention enables its products to be prestressed to about three times the level obtainable with the conventional product. Thus, this method provides products of greatly improved properties.

Figure 8:
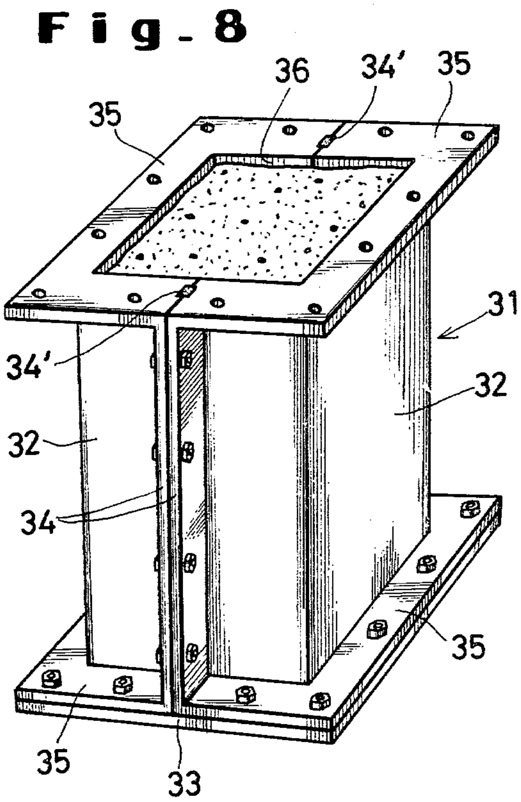
FIG. 8 is a perspective view of the molding frame of this invention in a state filled with fresh concrete mix.
Figure 9:
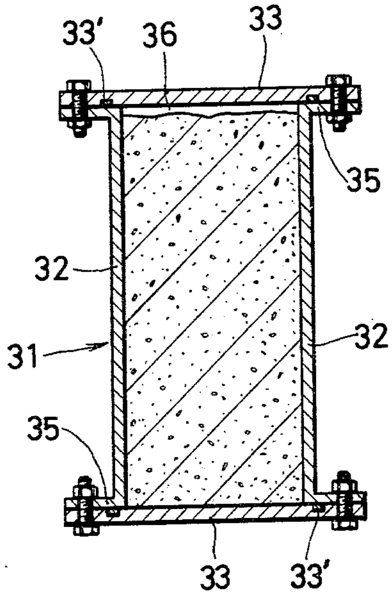
FIG. 9 is a longitudinal cross section of the molding frame of FIG. 8.

FIG. 8 and FIG. 9 represent yet another preferred embodiments. A molding frame 31, similarly to the preferred embodiments described above, is composed of a plurality of separable frame segments 32 and a plurality of cover pieces 33 adapted to close opposite end openings which are formed when the frame segments 32 are assembled. The frame segments 32, in the same way as those of the preceding preferred embodiments, are provided with flanges 34, 35 and are further provided with packings 33', 34' adapted to seal airtightly the interior of the molding frame when the frame segments and the cover pieces are assembled by face-to-face union.

Manufacture of concrete products by use of the molding frame 31 of the construction illustrated involves an initial procedure comprising the steps of assembling the frame segments 32 airtightly, closing one of the opposite end openings airtightly with one of the cover pieces 33 and placing concrete mix in the interior of the molding frame through the remaining end opening. In this case, the interior of the molding frame is filled with the concrete mix to such an extent that when the remaining end opening is airtightly closed with the remaining cover piece 33, there will be present a gap 36 by virtue of which the concrete will be prevented from suffering a loss of strength even under the conditions of elevated temperatures and increased pressure.

After the interior of the molding frame 31 is filled to an extent that there remains a gap 36 as described above, the remaining end opening is airtightly closed with the cover piece 33 and the molding frame thus completely sealed is subjected to heating. The size of this gap 36 is to be determined on the basis of the fact that, while the concrete mix is being heated at elevated temperatures, the strength developed within the gap withstands the thermal expansion of concrete. In spite of some allowance for the thermal expansion of concrete, the interior of this gap 36 is brought to the conditions of elevated temperatures and increased pressure, indicating that the heating of the molding frame results in manufacture of concrete products equivalent to those produced by the autoclaving method.

The various preferred embodiments of this invention use molding frames invariably made of a material capable of withstanding elevated temperatures and increased pressure of the order under which concrete mix held in the molding frames is subjected to thermal curing and involve a general procedure which comprises filling the molding frames with concrete mix, sealing the molding frames airtightly and thereafter subjecting the molding frames to heating at elevated temperatures. This means that the molding frames may be formed in any shape insofar as they are capable of being airtightly sealed for the purpose of the thermal treatment. Examples of molding frames usable advantageously for this invention include those formed of a plurality of separable frame segments and a plurality of cover pieces, those formed of a plurality of separable segments of a cylinder barrel and a plurality of cover pieces and those formed of a bottomed cylindrical frame and one cover piece as indicated in the preceding preferred embodiments. Further, these molding frames may incorporate parts which are removed from the concrete products after the curing treatment or which are not removed but are retained integrally in the concrete product after the curing treatment.

When the molding frame which has been filled with concrete mix and then sealed airtightly is heated at elevated temperatures, the concrete mix held inside the molding frame is heated and, consequently, chiefly the free water present therein is vaporized. In the sealed interior, the saturated steam temperature sharply increases to as high as 200° C., giving rise to the conditions of elevated temperatures and increased pressure.

Table 1 shows the relation between the saturated steam temperature and the pressure in the interior of the air-tightly closed molding frame without reference to the possible deformation of the molding frame due to its own thermal expansion.

TABLE 1

| Absolute pressure (kg/cm²) | Saturated steam temperature (°C.) |
|---|---|
| 1 | 99.1 |
| 2 | 119.6 |
| 3 | 132.9 |
| 4 | 142.9 |
| 5 | 151.1 |
| 6 | 158.1 |
| 7 | 164.2 |
| 8 | 169.6 |
| 9 | 174.5 |
| 10 | 179.0 |
| 11 | 183.2 |
| 12 | 187.1 |
| 14 | 194.1 |
| 16 | 200.4 |
| 18 | 206.2 |
| 20 | 211.4 |

It is clear from Table 1 that the saturated steam temperature within the molding frame rises in proportion as the absolute pressure in the interior of the molding frame is increased by the vaporization of water. Therefore, the fact that a given concrete mix placed in the molding frame and heated therein has a high water content immediately implies that the curing of this concrete mix occurs at a high temperature under a high pressure.

Now, the means used for heating the molding frame which has been filled with the concrete mix will be described by reference to the preferred embodiments illustrated in FIGS. 10 through 16.

Figure 14:
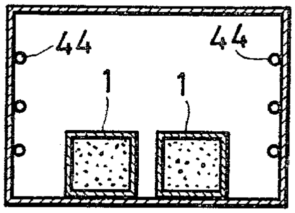
Figure 15:
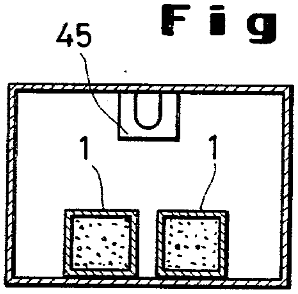
Figure 16:
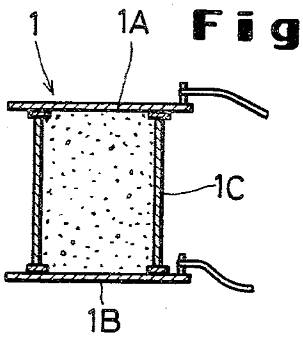

The means for heating the molding frame are roughly divided into two types: Those of one type apply heat externally (FIGS. 10 through 14) and those of the other type directly apply heat internally (FIGS. 15 and 16).

Figure 10:
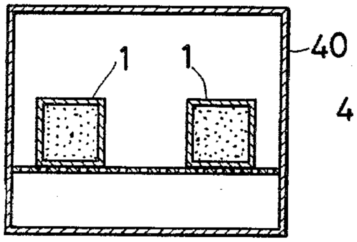
FIGS. 10–16 are explanatory diagrams illustrating various methods for the application of heat to the molding frames of the present invention in a state filled with fresh concrete mix.
Figure 11:
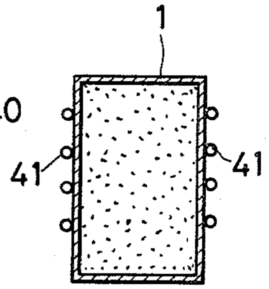
Figure 12:
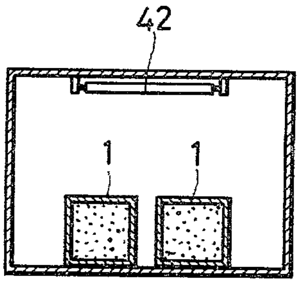
Figure 13:
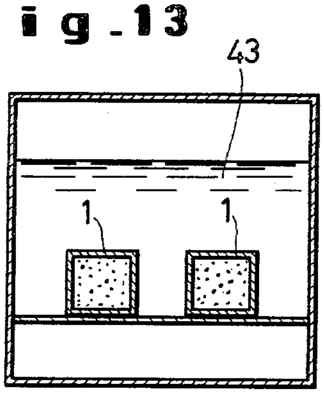

FIG. 10 illustrates a furnace 40 of the type using electricity, gas, oil or coal as its fuel, wherein molding frames 1 in a state filled with concrete mix are placed and heated. FIG. 11 illustrates a heating wire 41 directly fastened to a molding frame so as to heat the molding frame by passing electric current through the heating wire 41. FIG. 12 illustrates a furnace having an infrared lamp 42 attached therein, so that tightly closed molding frames 1 are heated by means of the infrared lamp 42. FIG. 13 illustrates a furnace which contains therein a bath of oil 43 adapted to have molding frames 1 immersed therein, so that the heating of the molding frames 1 is accomplished by heating the oil 43. FIG. 14 illustrates a heating furnace which has pipes 44 distributed on the erect walls of the furnace, so that tightly sealed molding frames 1 are heated by circulating oil heated to a high temperature through the pipes. FIG. 15 illustrates a furnace having disposed therein a high-frequency wave generator 45, so that the heating of concrete mix in tightly closed molding frames 1 is accomplished by irradiating the molding frames with high-frequency waves issuing from the generator 45 and thereby vibrating and heating the water present in the concrete mix. FIG. 16 illustrates a closed molding frame 1 having the upper wall 1A and the lower wall 1B thereof adapted respectively as an upper electrode and a lower electrode and the opposite lateral walls 1C thereof made of an insulating material, so that the heating of the concrete mix contained in the frame is accomplished by passing electric current therethrough with the water in the concrete serving as part of the electric circuit. Concrete mix, when placed in a tightly closed molding frame contemplated by the present invention, can be advantageously cured at elevated temperatures of the order of 200° C. by any of the simple methods illustrated by way of example in FIG. 10 through FIG. 16. Thus, this invention can manufacture concrete products possessing strength far greater than those manufactured by first releasing shaped concrete articles from their molds and subsequently subjecting them to curing.

No matter which one of the heating methods described above may be used, the concrete mix held inside the molding frame is heated and the water contained therein is vaporized when the molding frame is heated. Since the molding frame is retained in its tightly sealed state, the vapor so vaporized is never allowed to lead out and the saturated steam pressure inside the frame is consequently increased. When the concrete mix is heated up to 200° C., the absolute pressure in the frame rises to the neighborhood of 16 kg/cm$^2$ as shown in Table 1. This means that the concrete mix can be cured under temperature and pressure conditions identical to those obtained prevalently by the autoclaving method.

Although the heating time touched upon previously is variable in accordance with various factors including the shape and intended use of the particular concrete product, the ratio of ingredients used in the concrete mix, and the construction of the molding frame used, a heating time in the range of from six to eight hours suffices for the purpose of the curing. If the heating time is elongated, the excess time so spent results in no addition to the strength of the concrete product to be consequently obtained.

The concrete mix, while being heated, tends to deform under the inner stress which develops because of the thermal expansion of concrete. In the case of a concrete mix containing therein an empty space having a substantially circular cross section, the inner stress due to the thermal expansion occurs radially outwardly and not inwardly toward the center.

Therefore, even if a concrete product to be manufactured happens to contain therein an empty space having a substantially circular cross section, any possible deformation of the concrete product due to thermal expansion can be precluded by constructing the molding frame with its frame segments united strongly. When a part is disposed inside the molding frame, such possible deformation of concrete due to thermal expansion can be curbed by rendering the individual frame segments and the part itself amply resistant to pressure.

The present invention, therefore, has absolutely no need for the pre-curing treatment which is generally performed for the purpose of imparting initial strength to concrete mix between the time the molding frame is filled with concrete mix and airtightly sealed and the time the concrete mix in the frame is subjected to heating at elevated temperatures. As soon as the molding frame is airtightly sealed, the concrete mix can be subjected immediately to the curing at elevated temperatures under increased pressure. In the case of the preferred embodiment illustrated in FIGS. 4 and 5, if the part initially disposed inside the molding frame is removed from the frame interior before the concrete mix is finally subjected to the curing in its sealed state, the concrete mix is required to be set in advance to the extent that it keeps its outer cross-sectional shape unimpaired by the impacts exerted thereon during the removal of the part. The curing for this partial setting of concrete mix requires only a short time and offers no obstruction to the entire process of manufacture. In fact, the time required for this curing is very short compared with the time required such as in the autoclaving method which involves curing concrete mix with steam and subsequently releasing the cured concrete from molds.

When the concrete mix in a given shape has been cured under the conditions of elevated temperatures and increased pressure, it must be cooled to an ambient temperature. In the case of the concrete product manufactured by the autoclaving method, if the cured concrete product is cooled by suddenly lowering the temperature, thermal stress develops inside the concrete product owing to the temperature difference between the inside and the outside of the concrete product. This thermal stress acts in the form of tensile stress and produces cracks in the concrete product. For this reason, the cooling must be carried out very gradually.

According to the method of this invention, since the cured concrete product is enclosed within the molding frame, it is cooled by the molding frame cooling and at the same time exchanging heat with the concrete product held therein. If the molding frame is made of steel, it cools faster and shrinks more than the cured concrete product because steel has a higher thermal conductivity and thermal expansion coefficient than concrete. Consequently, the molding frame in effect exerts compressive force upon all sides of the concrete product held inside and represses the aforementioned tensile stress, making it possible to increase the gradient of temperature drop during the cooling period and curtail the cooling time. Further since the whole periphery of the concrete product is covered by the molding frame, the speed at which the concrete product cools off when the temperature is suddenly lowered during the cooling period is lower and the magnitude of thermal stress which develops during the cooling period is smaller than the conventional concrete product which is cooled in a state released from its mold.

As is clear from the foregoing description, this invention enjoys many advantages over the conventional autoclaving (high temperature and pressure) method, including extremely simple equipment, excellent effect, very short production period, namely the interval between the time fresh concrete mix is placed in the molding frame and the time cured concrete products are obtained, and outstanding workability. The concrete products of this invention have high dimensional accuracy because the deformation of concrete products due to thermal expansion can be repressed by the molding frame. Further, this invention permits manufacture of concrete products having molding frames retained therein as part thereof. The molding frames of such concrete products function as reinforcements, as handles for the convenience of workers engaging in conveyance of concrete products, as stopper means used to prevent concrete products from rolling randomly and for other various purposes.

Now, working examples of this invention will be cited.

EXAMPLE 1

Concrete products retained in closed molding frames (hereinafter referred to as C.F.) and concrete products retained in opened molding frames (hereinafter referred to as O.F.) were cured as described below.

(a) The curing was carried out in two different ways as indicated below.

(1) High-temperature curing with steam up to a temperature of 100° C.

(2) Super-high-temperature curing with heated oil above 100° C. in temperature.

(b) The raw materials used for the manufacture of concrete products were as follows.

Normal Portland cement having a specific gravity of 3.16 and high-early strength Portland cement having a specific gravity of 3.15 were used as the cement.

A commercially available water reducing agent (tradename "Mighty 150") was admixed with such cement.

In super-high-temperature curing, silica sand powder (having a specific gravity of 2.74 and a specific surface area of 4000 cm²/g) was used as admixture.

Fine aggregate having a specific gravity of 2.55 and a fineness modulus of 2.89 was used.

Coarse aggregate having a specific gravity of 2.62, a fineness modulus of 7.00 and a maximum size of 20 mm was used.

(c) Specific method of curing

The high-temperature curing up to 100° C. was carried out with steam, and the super-high-temperature curing above 100° C. was carried out with concrete products immersed in heated oil.

In the curing of C.F., the high-temperature curing up to 100° C. was carried out by rapidly elevating the temperature and the super-high-temperature curing above 100° C. was carried out by elevating temperature at a rate of 60° C./hour.

In the curing of O.F., the high-temperature curing up to 100° C. was carried out by elevating the temperature at a rate of 37° C./hour.

The super-high-temperature curing of O.F. was carried out after the products had been cured with steam.

(d) Proportioning of concrete

14 Concrete mixes having different mixing ratios of cement and water and different mixing ratios of aggregates and other ingredients were, each in the C.F. and O.F., cured under varying conditions to afford concrete products. The proportioning of ingredients in the 14 concrete mixes mentioned above are shown in Table 2.

TABLE 2

| Concrete mix symbol | Maximum size of coarse aggregate (mm) | Target slump (cm) | Range of air (%) | Fine aggregate percentage (%) | Water to cement ratio (%) | Water (kg) | Cement (kg) | Siliceous sand powder (kg) | Fine aggregate (kg) | Coarse aggregate (kg) | Water reducing agent (kg) | Remarks |
|---|---|---|---|---|---|---|---|---|---|---|---|---|
| $P_1$ | 20 | 4 + 1 | 1.5 + 1 | 45 | 28.6 | 143 | 500 | — | 758 | 975 | 3.0 | Normal plain concrete |
| $P_2$ | 20 | 4 + 1 | 1.5 + 1 | 45 | 35.0 | 175 | 500 | — | 826 | 872 | 0 | Normal plain concrete |
| $H_1$ | 20 | 4 + 1 | 1.5 + 1 | 45 | 35.0 | 175 | 500 | — | 740 | 954 | 0 | High-early strength plain concrete |
| $S_0$ | 20 | 4 + 1 | 1.5 + 1 | 35 | 25.0 | 125 | 500 | — | 627 | 1195 | 7.5 | Normal plain concrete |
| $S_1$ | 20 | 4 + 1 | 1.5 + 1 | 35 | 25.0 | 125 | 450 | 50 | 640 | 1218 | 7.5 | 10% silica |
| $S_2$ | 20 | 4 + 1 | 1.5 + 1 | 35 | 25.0 | 125 | 400 | 100 | 622 | 1187 | 7.5 | 20% silica |
| $S_3$ | 20 | 4 + 1 | 1.5 + 1 | 35 | 25.0 | 125 | 350 | 150 | 620 | 1182 | 7.5 | 30% silica |
| $S_2$ - 20 | 20 | 4 + 1 | 1.5 + 1 | 35 | 20.0 | 100 | 400 | 100 | 643 | 1226 | 10.0 | W/C = 20% |
| $S_2$ - 28 | 20 | 4 + 1 | 1.5 + 1 | 35 | 28.0 | 140 | 400 | 100 | 607 | 1158 | 5.0 | W/C = 28% |
| $S_2$ - 30 | 20 | 4 + 1 | 1.5 + 1 | 35 | 30.0 | 150 | 400 | 100 | 599 | 1140 | 3.0 | W/C = 30% |
| $S_2$ - 35 | 20 | 4 + 1 | 1.5 + 1 | 35 | 35.0 | 175 | 400 | 100 | 576 | 1098 | 0 | W/C = 35% |
| $S_2$ - 6 | 20 | 4 + 1 | 1.5 + 1 | 35 | 25.0 | 150 | 480 | 120 | 504 | 1087 | 6.0 | C + S = 600 kg/m³ |
| $S_2$ - 7 | 20 | 4 + 1 | 1.5 + 1 | 35 | 25.0 | 175 | 560 | 140 | 520 | 990 | 4.2 | C + S = 700 kg/m³ |
| $H_2$ | 20 | 4 + 1 | 1.5 + 1 | 35 | 25.0 | 125 | 400 | 100 | 622 | 1187 | 7.5 | 20% silica |

C: Cement
S: Silica
W: Water (e) Results

The concrete products obtained by curing the various concrete mixes mentioned above under varying conditions were tested for strength. The results were as shown in Table 3.

It is seen from Table 3 that when concrete mixes held in molding frames were cured at temperatures above 150° C., the products showed a notably high strength obtained immediately after the work of mold release which notably high strength is hardly attainable by products of high-temperature curing or products cured in the O.F.

In Table 3, the values shown for the purpose of comparison in the column titled "standard 28-day strength (kg/cm²)" are those which were obtained by causing concrete products released from molds to be cured under water at 20° C. for 28 days.

TABLE 3

| Kind of frame | Concrete mix symbol | Highest temperature (°C.) | Duration of standing at highest temperature (hr) | Water to cement ratio (%) | Strength of product immediately after mold release (kg/cm²) | Standard 28-day strength (kg/cm²) |
|---|---|---|---|---|---|---|
| C.F. | $P_1$ | 75 | 4 | 28.6 | 342 | 682 |
| | $P_2$ | | | 35 | 223 | 555 |
| | $H_1$ | | | 35 | 298 | 631 |
| | $P_1$ | 90 | 3.5 | 28.6 | 327 | 653 |
| | $P_2$ | | | 35 | 127 | 563 |
| | $H_1$ | | | 35 | 262 | 701 |
| O.F. | $P_2$ | 20 | 24 | 35 | 103 | 550 |
| | $H_1$ | | | 35 | 144 | 658 |
| | $P_1$ | 75 | 3 | 28.6 | 280 | 557 |
| | $P_2$ | | | 35 | 257 | 511 |
| | $H_1$ | | | 35 | 220 | 565 |
| | $S_0$ | 150 | 6 | 25 | 829 | 653 |
| | $S_2$ | | | | 822 | 601 |
| | $S_0$ | 180 | 6 | 25 | 866 | 647 |
| | $S_2$ | | | | 1104 | 569 |
| | $S_0$ | 200 | 6 | 25 | 960 | 770 |
| | $S_1$ | | | | 1195 | 797 |
| | | | 4 | | 1199 | 585 |
| C.F. | $S_2$ | 200 | 6 | 25 | 1287 | 585 |
| | | | 8 | | 1293 | 585 |
| | $S_2$ - 20 | 200 | 6 | 20 | 1407 | 741 |
| | $S_2$ - 28 | | | 28 | 1236 | 629 |
| | $S_2$ - 30 | | | 30 | 1096 | 608 |
| | $S_2$ - 35 | | | 35 | 854 | 556 |
| | $S_3$ | 200 | 6 | 25 | 1160 | 599 |
| | $S_2$ - 6 | 200 | 6 | 25 | 1283 | 680 |

TABLE 3-continued

| Kind of frame | Concrete mix symbol | Highest temperature (°C.) | Duration of standing at highest temperature (hr) | Water to cement ratio (%) | Strength of product immediately after mold release (kg/cm$^2$) | Standard 28-day strength (kg/cm$^2$) |
|---|---|---|---|---|---|---|
| | $S_2$ - 7 | | | | 1187 | 654 |
| | $H_2$ | 200 | 6 | 25 | 1357 | 758 |
| | $S_2$ | 220 | 6 | 25 | 1173 | 716 |
| | $S_0$ | | | | 398 | 649 |
| O.F. | | 180 | 6 | 25 | | |
| | $S_2$ | | | | 442 | 595 |

EXAMPLE 2

The following test was performed to determine the effects which curing conditions such as the pre-curing period, the temperature-increasing time during the heating period and the cooling time have on the compressive strength of concrete products.

(a) Proportioning of concrete

The concrete mixes of the proportionings indicated by the symbol $S_2$ in Example 1 were used.

(b) Methods of curing (1) The highest temperature during the heating period was 200° C. and the duration of standing at this highest temperature was six hours.

(2) Three pre-curing times, 2, 6 and 18 hours (the interval between the time the concrete mix was placed and sealed in the molding frame and the time the heating was started), were used.

(3) During the heating period, the temperature increase was made at three rates, 60° C./hr, 100° C./hr and 160° C./hr.

(4) As to the manner of cooling, some products were removed immediately after the lapse of the duration of standing at the highest temperature and left to cool off spontaneously (spontaneous cooling) and other products were allowed to cool off gradually within a curing chamber at a temperature decreasing rate of about 10° C./hr (slow cooling).

(c) Results

Concrete products cured under varying conditions (prestanding time, temperature increasing time during the heating period and cooling) were tested for compressive strength immediately after the mold release. The results are shown in conjunction with the data of standard 28-day strength in Table 4.

TABLE 4

| Pre-standing time (hr) | Temperature increasing rate (°C./hr) | Cooling condition | Strength of product immediately after mold release (kg/cm$^2$) |
|---|---|---|---|
| 18 | 60 | spontaneously | 1162 |
| 18 | 60 | slow | 1039 |
| 2 | 60 | spontaneously | 1212 |
| 2 | 60 | slow | 1228 |
| 6 | 60 | spontaneously | 1275 |
| 18 | 100 | spontaneously | 1164 |
| 18 | 160 | spontaneously | 1171 |
| 2 | 100 | spontaneously | 1223 |
| 2 | 160 | spontaneously | 1159 |
| 2 | 160 | slow | 1217 |

As is clear from the foregoing table, the strength of concrete products of the present invention immediately after the work of mold release was little affected by variations in curing conditions and the strength was about twice that of a standard 28-day strength (which was about 650 kg/cm$^2$).

What is claimed is:

1. A method for the manufacture of concrete products, which comprises the steps of (a) filling a cavity in a molding frame of a material capable of withstanding elevated temperatures and superatmospheric pressures with fresh concrete mix;

(b) airtightly sealing the cavity of the molding frame filled with the concrete mix; and (c) heating the molding frame to raise the temperature in the cavity to 150° C. to 220° C. whereby steam generated by the raised temperature in the cavity cures the concrete mix therein under conditions of elevated temperatures and superatmospheric pressure.

2. The method of claim 1, wherein a part is inserted into the cavity before it is filled with the fresh concrete mix, and the part is removed from the cavity before the cavity is airtightly sealed and heated.

3. The method of claim 1, wherein a part is inserted into the cavity before it is filled with the fresh concrete mix, and the cavity containing the part and the concrete mix is airtightly sealed and heated.

4. The method of claim 1, wherein the cavity is filled with the fresh concrete mix to an extent that leaves therein an empty space of a size which entails no loss of strength of the cured product.

5. The method according to claim 1, which further comprises allowing the concrete mix which has been cured inside the cavity to be cooled while being retained therein.

* * * * *